(No Model.)
T. JACK.
DRIVING BELT.
No. 252,109.  Patented Jan. 10, 1882.
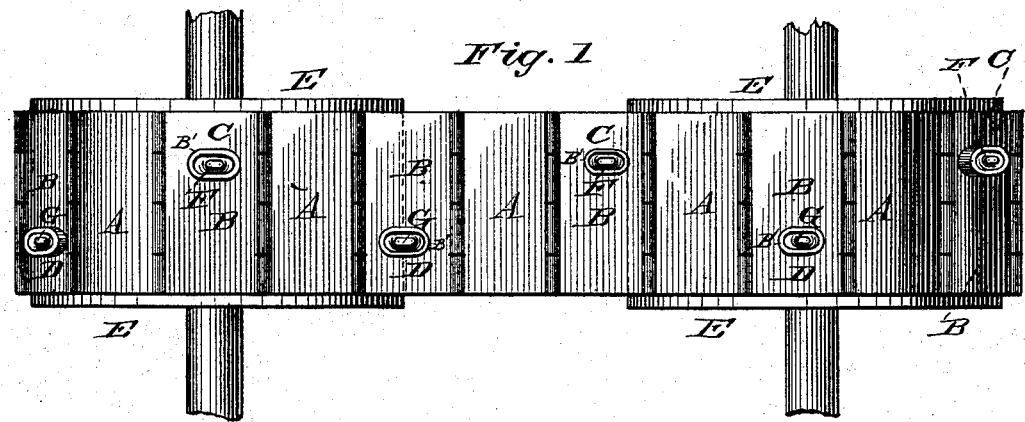
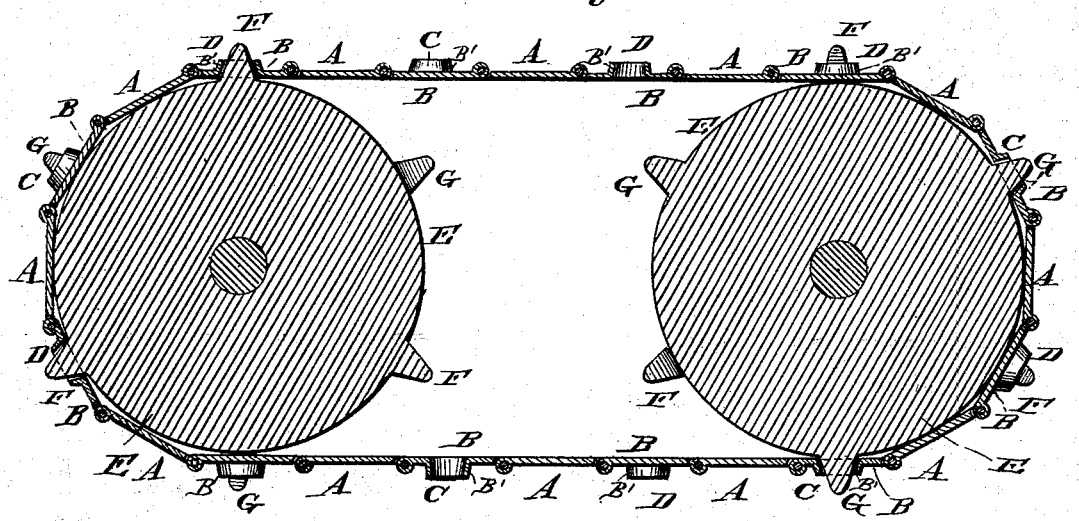
WITNESSES
Fred. G. Dieterich
P. C. Dieterich
INVENTOR
Thomas Jack
by A. Snow & Co.
Attorneys

UNITED STATES PATENT OFFICE.

THOMAS JACK, OF AUBURN, NEW YORK.

DRIVING-BELT.

SPECIFICATION forming part of Letters Patent No. 252,109, dated January 10, 1882.

Application filed November 25, 1881. (No model.)

*To all whom it may concern:*

Be it known that I, THOMAS JACK, of Auburn, in the county of Cayuga and State of New York, have invented certain new and useful Improvements in Driving-Belts; and I do hereby declare that the following is a full, clear, and exact description of the invention, which will enable others skilled in the art to which it appertains to make and use the same, reference being had to the accompanying drawings, which form a part of this specification.

Figure 1 is a plan view, and Fig. 2 is a longitudinal vertical sectional view.

Similar letters of reference indicate corresponding parts in both figures.

This invention relates to driving-belts for communicating motion in all kinds of machinery; and it consists in certain improvements in the construction of the same, which will be hereinafter fully described, and particularly pointed out in the claims.

My improved drive belt consists of a series of links or plates suitably hinged together, as shown, so as to be capable of traveling upon the wheels or pulleys, from one of which motion is to be communicated to the other. Of the said links or plates constituting the drive-belt, every alternate one (represented by A) is solid or imperforate. The intermediate links or plates, which are represented by B, have perforations or openings oblong or elliptical in shape, provided with upward-projecting circumferential flanges B′, and located in alternate plates on opposite sides of the belt, as shown respectively at C and D.

E E represent the wheels or pulleys connected by my improved drive-belt. Said wheels or pulleys are provided with radially-extending lugs or studs F G, located alternately adjoining the opposite sides thereof, so as to engage the openings C D of the links B of the drive-belt.

The operation of my invention will be readily understood. When actuated by any suitable power, one of the wheels E revolves. The motion is communicated through the belt to the other wheel. The flanges B′ of openings C D form enlarged bearings for the studs F G, which are therefore not liable to slip. Said flanges, which may be struck up from the metallic plates, also take up the wear and greatly increase the strength and durability of the belt. Loose wear-plates may also be adjusted upon flanges B′ when, after long use, they shall be so worn as to cause the belt to slip. Owing to the peculiar arrangement of studs F G and openings C D, the strain is evenly distributed, the motion is even and steady, and the chain is not liable to become disengaged.

I claim—

1. A drive-belt consisting of alternate imperforate or solid and perforated plates, the perforations being arranged alternately on opposite sides of a longitudinal central line, substantially as set forth.

2. The combination, with the driving-pulleys having radially-projecting lugs or studs arranged alternately on opposite sides, of a driving-belt consisting of alternate solid and perforated plates, the perforations being arranged alternately on opposite sides of a central longitudinal line, so as to engage the studs of the driving-pulleys, substantially as set forth.

3. In a drive-belt, the plates B, having perforations surrounded by upward-projecting flanges, substantially as and for the purpose set forth.

In testimony that I claim the foregoing as my own I have hereto affixed my signature in presence of two witnesses.

THOMAS JACK.

Witnesses:
JOHN WILLEAN HUTCHINSON,
GEORGE ORTEN REAPER.